United States Patent [19]

Cochard

[11] Patent Number: 4,938,094
[45] Date of Patent: Jul. 3, 1990

[54] DEVICE FOR EFFECTING THE FINE ADJUSTMENT OF THE ANGULAR ORIENTATION OF A STEERING-WHEEL ON A MOTOR VEHICLE STEERING-WHEEL SHAFT

[75] Inventor: Jean-Pierre Cochard, Carrieres sur Seine, France

[73] Assignee: ECIA - Equipements et Composants pour l'Industrie Automobile, Audincourt, France

[21] Appl. No.: 282,188

[22] Filed: Dec. 9, 1988

[30] Foreign Application Priority Data

Dec. 9, 1987 [FR] France .............................. 87 17156

[51] Int. Cl.⁵ ........................ B62D 1/04; B62D 1/18
[52] U.S. Cl. ..................................... 74/552; 403/259; 403/374; 74/492; 74/433
[58] Field of Search .................. 74/552, 558, 484 R, 74/492, 493; 29/159 B; 280/750, 777, 778, 731; 464/160, 161; 403/259, 374, 4, 365

[56] References Cited

U.S. PATENT DOCUMENTS 4,306,466 12/1981 Coveney ............................. 74/548
4,607,539 8/1986 Arima et al. ........................ 74/492
4,624,596 11/1986 Eckendorff ..................... 403/259 X
4,662,775 5/1987 Faul .................................. 74/552 X
4,840,078 6/1989 Shitanoki ......................... 74/484 R

FOREIGN PATENT DOCUMENTS 0148794 7/1985 European Pat. Off. .............. 74/552
0233813 8/1987 European Pat. Off. .............. 74/552
648165 7/1937 Fed. Rep. of Germany ........ 74/552
1480712 8/1969 Fed. Rep. of Germany ........ 74/552
3400609 2/1985 Fed. Rep. of Germany ........ 74/552
3727638 3/1988 Fed. Rep. of Germany ........ 74/552
970444 1/1951 France .................................. 74/552
2161392 7/1973 France .................................. 74/552
2479506 10/1981 France .................................. 74/552
2527156 11/1983 France .................................. 74/552
2592925 7/1987 France .................................. 74/552
2594086 5/1988 France .................................. 74/552
0210164 9/1987 Japan ................................... 74/552
598755 2/1948 United Kingdom ................. 74/552
2055451 3/1981 United Kingdom ................. 74/552

Primary Examiner—Vinh T. Luong
Attorney, Agent, or Firm—Sughrue, Mion, Zinn, Macpeak & Seas

[57] ABSTRACT

A device for effecting fine adjustment of the orientation of a steering wheel on a shaft (10), which are joined together by a fastener (30), has a sleeve (40) interposed between the end (11) of the shaft (10) and the hub (20) of the steering wheel. The sleeve and the shaft define between them an annular chamber (42) in which is housed a friction member (50) opposing their spontaneous relative rotation. The fine adjustment, limited to a value of about 9°, is made with the aid of an arrangement including a control mechanism, amplitude limiters, and stops. These stops ensure continuity of transmission of the torque exerted on the steering wheel to the shaft in the event of slackening of the fastener or failure of the amplitude limiters.

20 Claims, 3 Drawing Sheets

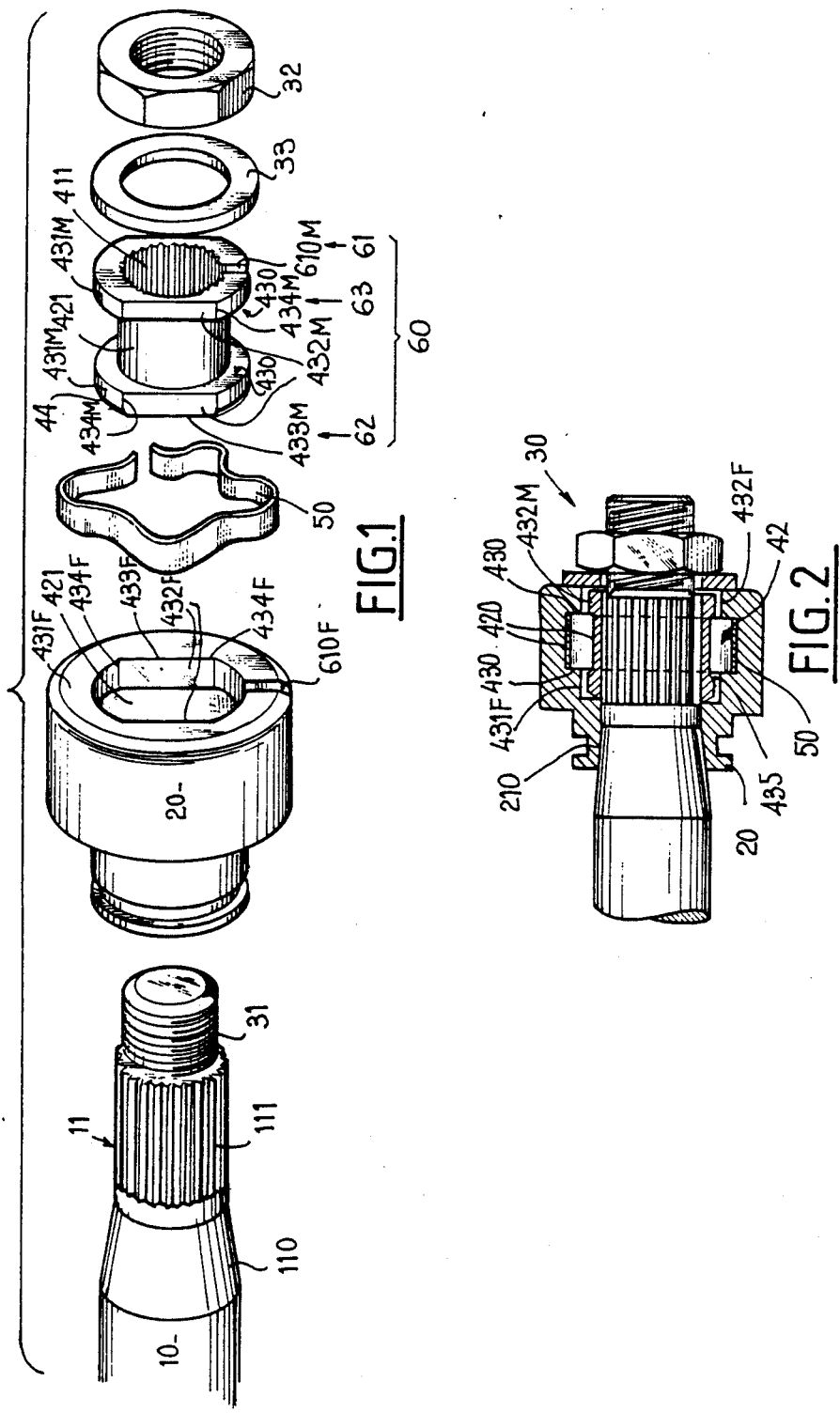

DEVICE FOR EFFECTING THE FINE ADJUSTMENT OF THE ANGULAR ORIENTATION OF A STEERING-WHEEL ON A MOTOR VEHICLE STEERING-WHEEL SHAFT

BACKGROUND OF THE INVENTION

The present invention relates to the adjustment of the angular position of a steering wheel on a steering-column shaft of a motor vehicle, and more particularly has as its object a device for the fine adjustment of the relative angular orientation setting of a steering-column shaft and a steering wheel of a motor vehicle, which are joined together by fastening means of the screw and nut type.

It is usual for a steering wheel in a motor vehicle to comprise a rim and a hub, which are joined together in the conventional manner by one or more radial spokes.

The hub is most often metallic and enclosed in a structure usually consisting of plastics material, if necessary equipped with reinforcements.

The setting of the orientation of the steering wheel on a free end of a steering-column shaft is generally effected with the aid of an interengaging connection system consisting of splines which are formed in the steering column and which engage with corresponding complementary splines on the hub.

Torque is generally transmitted from the steering wheel to the shaft by a conical joint comprising a female conical bearing surface on the hub and a male conical bearing surface on the shaft.

The steering wheel is mounted axially on the steering-column shaft with the aid of screw and nut fastening means, for example a self-locking nut which is screwed onto the threaded end of the steering-column shaft and which bears against a washer interposed between this nut and the hub.

The steering wheel is fitted on the steering column after the various adjustments of the front axle assembly of the vehicle have been completed. These adjustments are made after the steering drag link and the steering column associated with it have been placed in position. This has repercussions on the steering column, and the shaft of the latter turns to a greater or lesser extent about its axis.

It will then be realized that in most cases the splines carried by the steering-column shaft will not occupy an angular position enabling the steering wheel to be placed in position with an orientation such that the spokes of the steering wheel will assume an exact position dictated by aesthetic considerations and allowing comfortable driving with, in addition, a clear view of the facia instruments through this steering wheel.

Furthermore, subsequent steering adjustment operations after the steering wheel has been fitted, in the course of servicing or repairs, may displace the orientation of the steering wheel in relation to the original setting.

This original setting is relatively coarse and dependent on the pitch of the splining.

In order to provide a partial remedy for these shortcomings it has been proposed to increase the number of splines. The steering wheel is usually angularly secured on the steering-column shaft by forty splines; the uncertainty of the position of the steering wheel is then 9°.

In order to restore the theoretical ideal orientation of the steering wheel, in some cases the adjustment of the front axle assembly of the vehicle is slightly manipulated by acting on the track rods; although this may satisfy aesthetic needs, it cannot fail to impair driving accuracy or to result in dissymetrical tire wear.

To achieve strictly accurate orientation of the steering wheel to a greater extent than the value indicated above, various solutions have been proposed which permit fine adjustment of the relative angular orientation setting of the steering wheel on the steering-column shaft.

Examples of such solutions are the following.

French Patent No. 2 557 992 (corresponding to U.S. Pat. No. 4,624,596) describes a device of this kind. This device comprises essentially a ring or sleeve provided on its inner surface with means for coupling to a steering-column shaft, and on its outer surface with means for coupling to a steering wheel hub. This ring or sleeve is capable of axial translatory movement with the aid of a control member, and at least one of the coupling means is arranged to bring about not only the axial translation of the ring but also an angular displacement of the hub, and therefore of the steering wheel.

French Patent No. 2 592 925 (July 17, 1987) proposes another device of this kind. This device comprises an intermediate sleeve interposed between the shaft and the hub. This sleeve is connected to the shaft with the aid of splines in such a manner as to be capable of axial translatory movement. This sleeve is also connected to the hub with the aid of a screwthread, in such a manner as to be movable, particularly rotatable, in relation to the hub. By acting on the relative angular position of the hub and of this sleeve, which are then locked on the shaft by means of a conical joint, fine adjustment of the orientation of the steering wheel can be achieved.

French Patent No. 2 594 086 (Aug. 14, 1987) describes another device of this type, the construction of which is however much more complex. It also makes use of an intermediate sleeve between shaft and hub, and employs a two-part hub. Use is made of a system of wedges movable axially and relative to one another to act on notches of adjustable size disposed on the front face of the hub and of the sleeve, in order to achieve the fine adjustment of the orientation of the steering wheel.

Although all these devices enable fine adjustment to be achieved, they all have the same disadvantage, particularly because of their relatively complex construction, which accordingly increases the cost of manufacture, assembly and fitting, and even the cost of servicing.

SUMMARY OF THE INVENTION

The invention therefore seeks to solve the problem indicated above by providing an adjustment device which is exempt from the abovementioned disadvantages, and which is simple and reliable while enabling the desired adjustment to be made quickly and easily, while its cost is relatively modest despite its great reliability.

The object of the invention is a device for the fine adjustment of the relative angular orientation setting of a steering-column shaft and a steering wheel in a motor vehicle, which are joined together by fastening means of the screw and nut type, wherein said shaft has an end provided with a male conical bearing surface of a conical joint and with external rectilinear axial splines of an interengaging connection system, and wherein said steering wheel comprises, among other parts, a hub having a female conical bearing surface complementary to the male conical bearing surface of the conical joint which it is intended to receive. This device also comprises a sleeve which is interposed between the hub and the end and which has internal rectilinear axial splines complementary to the external splines of the interengaging connection system with which they are intended to engage.

This device is remarkable in that said sleeve and said hub define between them an annular chamber, in that a friction member is received in the chamber to develop a frictional torque between the sleeve and the hub to oppose their spontaneous relative rotation, and in that said sleeve and said hub carry an arrangement to displace the latter relative to the former only in respect of rotation, said arrangement comprising a control mechanism to overcome the frictional torque developed by the friction member, amplitude limiters determining the value of the maximum angle $\theta$ of relative rotation permitted, and safety limit stops.

Other characteristics of the invention will emerge on perusal of the following description and claims and examination of the accompanying drawings, which are given solely by way of example and in which:

BRIEF DESCRIPTION OF THE DRAWINGS

FIG. 1 is an exploded schematic view in perspective of one form of construction of the device according to the invention;

FIG. 2 longitudinal meridian section of the device shown in FIG. 1, shown here assembled;

DETAILED DESCRIPTION OF PREFERRED EMBODIMENTS

Figure 3A:
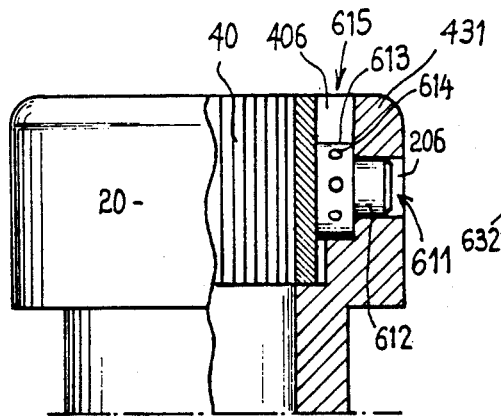
FIGS. 3A and 3B partial representations of another embodiment of the invention, in partial axial section and top plan view respectively.

Since the steering columns of motor vehicles are well known, particularly the part of these columns which is situated in the passenger compartment where the steering wheel is located, only what relates to the invention will be described below. In other respects the specialist will have to resort to the standard solutions at his disposal in order to deal with any particular problems with which he is confronted.

Hereinbelow the same reference numeral will be used to designate homologous components.

As can be seen in FIGS. 1 and 2 of the drawing, a steering column comprises a shaft 10 terminating at the passenger compartment end in an end portion 11.

A steering wheel, of which only the hub 20 is shown, is associated with this shaft.

In order to transmit the torques which the driver produces on the steering wheel, the hub 20 is connected to the shaft 10 with the aid of a conical joint, as is standard practice. This conical joint comprises a male conical bearing surface 110 on the end 11 and a female conical bearing surface 210, complementary thereto, in the hub 20.

To achieve the rough angular setting of the steering wheel on the shaft use is made of an interengaging connection system, which usually consists of axial splines, such as the splines 111 carried by the outer surface of the end 11, and complementary splines which are directly or indirectly associated with the hub and to which further reference will be made later on. When forty peripheral splines are used, as is customary, an orientation adjustable in steps of 9° can thus be obtained.

This hub and this shaft are joined together with the aid of fastening means 30. These fastening means comprise, for example, a threaded portion 31, resembling a screw, on the end 11, and a nut 32 with which a washer 33 is associated.

Instead of adopting a solution of this kind, it is also possible to arrange for the end 11 to be provided with a threaded axial bore in which a screw can be fastened.

As can clearly be seen in FIG. 2, this device also includes a sleeve 40, which is interposed between the hub 20 and the end 11. The inner surface of this sleeve has rectilinear axial splines 411 complementary to the external splines 111 of the interengaging connection system previously mentioned.

As will be seen, particularly on examination of the axial section shown in FIG. 2, this sleeve 40 and this hub 20 define between them an annular chamber 42 which has cylindrical walls 420 and rim walls 430. At least one of these rim walls 430 is defined by concentric flanges 431 and 431M, facing one another, on the sleeve and hub, respectively. Each of these flanges has at least one flat 432; these flats 423M on the sleeve and 432F on the hub are intended to be placed facing one another with radial clearance allowing progressive, continuous relative rotation limited to a given maximum angle $\theta$ between sleeve and hub. The value of this angle $\theta$ is of the order of about 8° to 9°. In fact, as clearly illustrated, the chord 433F of the flat 432F on the hub is shorter than that 433M of the flat on the sleeve; this can be seen in the drawing. These flats 432M and 432F end in axial edges 434M and 434F, respectively.

As illustrated, each of the flanges 432F and 431M preferably has two diametrically opposite flats 432F and 432M, respectively.

The chamber 42 houses a friction member 50 producing a frictional couple or torque between the sleeve 40 and the hub 20 to oppose their spontaneous relative rotation when the device according to the invention is assembled as illustrated in FIG. 2 but before the fastening means 30 have been tightened, so that the conical joint does not yet exert its normal action.

In the embodiment shown in FIGS. 1 and 2 this friction member 50 consists of a spring strip, for example of metal, which is corrugated and bent as illustrated.

In the case of the embodiment shown all the rim walls 430 are provided with flanges 431M and 431F, all of which have two flats 432M and 432F disposed diametrically opposite. In an embodiment of this kind the cylindrical walls 420 of the annular chamber are formed by the bottoms of grooves 421 formed both in the hub 20 and in the sleeve 40.

Figure 5:
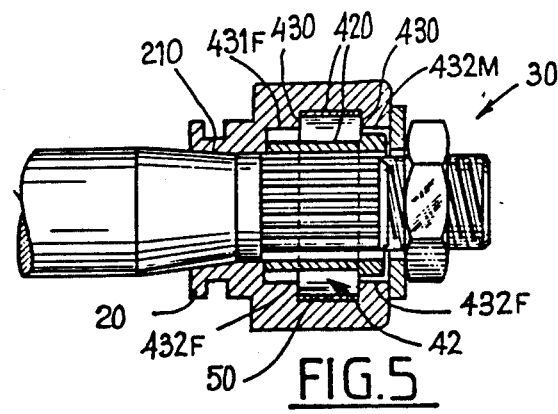
FIGS. 5 and 6 are similar views to those in FIGS. 2 and 3B, respectively, of additional different embodiments of the invention.
Figure 6:
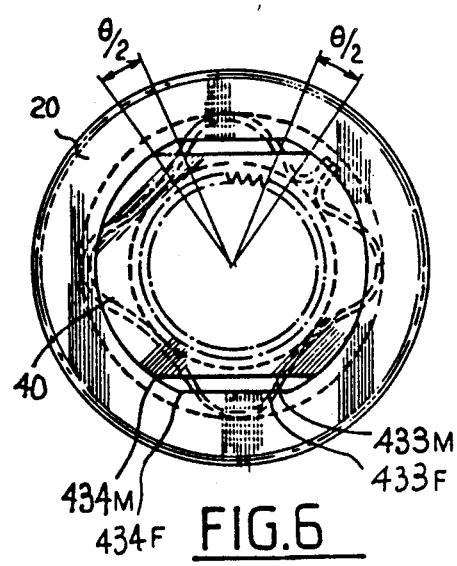

These flanges 431M and 431F may have the same (FIGS. 1 and 2) or different (FIG. 5) diameters, the smaller then being the one which is intended to be closer to the conical joint.

It is clear that the sleeve may also have a completely smooth cylindrical body and be provided with only one flange 431M situated at its end or face intended to be remote from the conical joint.

That end face of the sleeve 40 which is directed towards the conical joint is preferably provided with a chamfer 44. This chamfer facilitates the introduction of the sleeve into the hub once the friction member has been placed in the chamber. This introduction is effected with the aid of a press, if necessary.

That face of the rim wall which is close to the conical joint is in turn, where applicable, provided with a bevel 435, to which further reference will be made later on.

As can be seen, at least two notches 610F and 610M are provided, one on the hub 20 and the other on the sleeve 40, on their respective faces remote from the conical joint.

A device according to the invention, of which FIG. 1 illustrates one embodiment, is pre-assembled as shown in FIG. 2. The device having thus been assembled, the steering wheel hub equipped with its sleeve and its friction member is placed on the end of the steering-column shaft. The engagement of the splines on the sleeve with the corresponding complementary splines on the end enables the rough orientation of the steering wheel relative to the shaft to be made. The accuracy of this adjustment is dependent on the pitch of the splining, as already indicated.

In order to effect the continuous, progressive fine adjustment, the amplitude of which results from the clearance provided between the chords 433M and 433F of the flats 432M and 432F on the sleeve 40 and on the hub 20, which face one another, a screwdriver or the like is inserted into the notches 610M and 610F and the hub and sleeve are turned relative to one another against the action of the relatively powerful friction developed by the friction member 50. When this has been done and the correct final orientation has been sought and found, it is then sufficient to tighten the nut 32 to effect the definitive locking of the hub on the shaft by means of the conical joint, as is the conventional practice.

The chamfer 44 facilitates the assembly operation and, more particularly, the introduction of the sleeve into the hub provided with its friction member, as already indicated.

When the sleeve has thus been placed in the hub, with the interposition of the friction member, it is impossible to withdraw it when, as illustrated, on FIG. 1 it is provided with a groove whose face is oriented at right angles to the axis (not given a reference). The assembly cannot be dismantled.

If it is desired to be able to withdraw the sleeve from the hub, a certain angle is given to said face by providing a bevel 435 on it, as illustrated on FIG. 2.

Such an operation for the extraction of the sleeve from the hub is for example necessary when it is desired to change the original steering wheel fitted to the motor vehicle, in order to replace it with a leather steering wheel or a so-called sports steering wheel of small diameter.

As can be realized, in addition to the fine adjustment of the relative orientation of the hub in relation to the shaft which the device according to the invention permits, this device provides great reliability.

If in fact the fastening means 30 should become loose or develop play, resulting in slight backlash in the conical joint, the two flats 432M and 432F could turn relative to one another until their end edges 434M and 434F come into contact as stops 63. This would result in a dislocation which would impair the aesthetic appearance and driving comfort because the spokes of the steering wheel would no longer have their original orientation, but in no case would the transmission of torque be interrupted.

Furthermore, the notches 610M and 610F may also contribute towards facilitating the orientation of the hub during manufacture of the steering wheel, and subsequently towards making more convenient and rapid the fitting of the steering wheel equipped with the device according to the invention on the steering-column shaft.

From the above description relating to one particular embodiment, it can clearly be seen that the device according to the invention includes an arrangement 60 for progressive, continuous fine adjustment, comprising a control mechanism means 61 for overcoming the frictional couple developed by the friction member 50; this arrangement also comprises means 62 limiting the amplitude of relative rotation determining the maximum value of the angle $\theta$ permitted, and of safety stop means 63. This mechanism 61 here comprises the notches 610M and 610F, said limiting means 62 comprise the chords 433M and 433F of the flats 432M and 432F, and said safety stop means 63 comprise the edges 434M and 434F of the flats 432M and 432F.

Figure 3B:
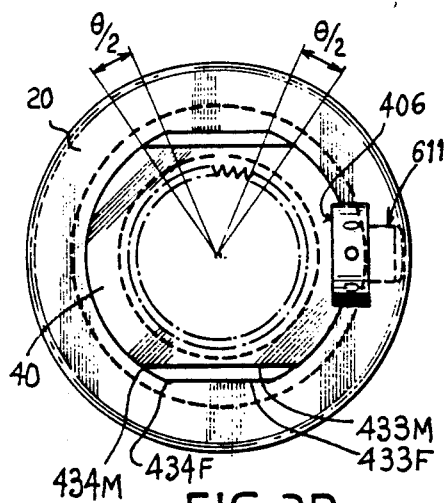

Reference will now be made to the embodiment illustrated in FIGS. 3A and 3B.

As can be seen, the hub 20 is pierced with a radial cylindrical hole 206 and the sleeve 40 has cut in its periphery a buttonhole 406 in the form of an open rectilinear axial slot.

A cam stud 611 is inserted between the hub and the sleeve. Thus stud 611 comprises a rod 612 and a disc 613, both of which are cylindrical and eccentric in relation to each other, so as to serve as a cam. The rod 612 is engaged in the hole 206, where it can turn, and the disc is engaged practically without clearance in the buttonhole 406, where it can move.

The periphery of the disc 613 carries regularly distributed sockets 614, for example cylindrical channels, while in the flange or flanges 431 an access window 615 is provided to permit access to the sockets in the disc of the stud.

In this embodiment there are no notches 610, and the friction member 50 is the same as in FIGS. 1 and 2.

For assembly purposes the rod of the stud is engaged in the hole in the hub, the friction member is placed in position, and the sleeve is inserted into the hub in such a manner that on the one hand the flats and on the other hand the disc and the buttonhole respectively correspond.

In order to proceed to the continuous, progressive fine adjustment of the orientation of the steering wheel in relation to the shaft, a pin is inserted, with the fastening means untightened, through the access window and inserted into one of the sockets. The stud is progressively turned with the aid of the pin. The rod swivels in the hole in the hub and the relatively eccentric disc, then serving as a cam, bears against one of the flanks of the buttonhole in the sleeve held by its splines on the shaft. A relative rotation of the sleeve and hub is thus brought about.

In this embodiment the control mechanism means 61 is composed of the stud 611 with its rod 612 and its disc 613, with its sockets 614 accessible through the access window 615, together with hole 206 and the buttonhole 406. The amplitude limiting means 62 is in turn composed of the cam formed by the relative eccentricity given to the disc and to the rod. The safety stop means 63 are here again the edges of the flats. These safety stop means are used only in the event of fracture of the stud.

Figure 4A:
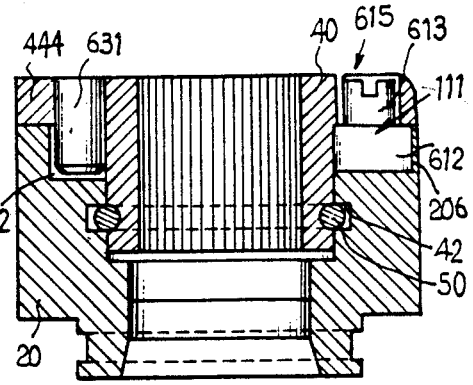
FIGS. 4A and 4B are similar views to those in FIGS. 3A and 3B of a different embodiment of the invention.
Figure 4B:
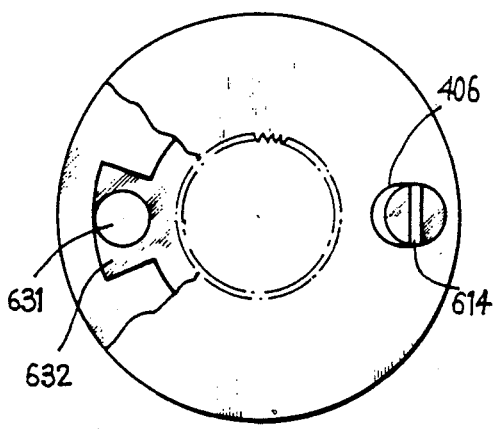

The embodiment of the invention shown in FIGS. 4A and 4B will now be examined.

Schematically, it may be said that the stud 611 has undergone a rotation of a quarter-turn, and instead of being radial it is now axial. Otherwise, as shown in the drawing, the friction member is now an elastic ring and the safety stop means 63 have been modified, the flats being dispensed with.

As can be seen, the socket 40 now has a shoulder 444 capping the hub, as illustrated.

The buttonhole 406, which is here a closed rectilinear radial slot, is hollowed out in the shoulder. The cylindrical hole 206 is formed in the end face of the hub and also serves as access window.

The socket 614 is here a screwdriver slot, as illustrated.

To serve as safety stop means 63 use is made of a protuberance 631 associated with the sleeve, and of a recess 632 formed in the hub. As the torn away part of FIG. 4B shows, the protuberance can move in the recess, but in the event of the fracture of the stud it will bear against the edge of the recess and prevent any further relative rotation of the hub and the sleeve.

In this embodiment the protuberance is an attached pin engaged in the shoulder of the sleeve; it is clear that this protuberance may be in one piece with the sleeve and be integrally produced therewith. Similarly, the relative arrangements relating to the protuberance and the socket may be reversed.

In order to proceed to the assembly of this embodiment and to effect progressive, continuous fine adjustment, the procedure is as explained in connection with FIGS. 3A and 3B.

It is thus possible to understand all the interest and advantage of the device according to the invention, which is extremely simple since it comprises only a sleeve, a friction member, and optionally a cam stud.

In addition, it will be observed that the geometry of the cooperating parts is highly restrained, thus leading to a small number of machining operations which are easy to carry out with the aid of conventional machine tools.

I claim:

1. In a steering column for a motor vehicle and having a shaft and a steering wheel and having means for providing a progressive and continuous fine adjustment of a setting of a relative angular orientation of the shaft and the wheel the position of which is fixed by a screw and nut fastening means (30), the improvement comprising:
   a shaft (10) having an end (11) provided with a male conical bearing surface (110) of a conical joint and with external rectilinear axial splines (111) of an interengaging connection system;
   a steering wheel hub (20) provided with a female conical bearing surface (210) complementary to said male conical bearing surface (110) of the conical joint adapted to receive said male conical bearing surface (110);
   a sleeve (40), interposed between said shaft end (11) and said hub (20), provided with internal rectilinear axial splines (411) complementary to said external rectilinear axial splines (111) and adapted to be interengaged with the latter and defining together with said hub (20) an annular changer (42), said hub (20) and sleeve (40) being movable in rotation relative to one another;
   a friction member (50) located in said chamber (42) and adapted to develop a frictional torque between said hub (20) and sleeve (40) to oppose their spontaneous relative rotation; and
   an arrangement means (60) carried by said hub (20) and sleeve (40) to rotate only along an angle said hub (20) and sleeve (40) against the frictional torque of said friction-member (50) and comprising: control mechanism means (61) to overcome said frictional torque to finely adjust the relative position of said hub (20) and sleeve (40); amplitude limiter means (62) for determining the value of a maximum angle ($\theta$) of the relative rotation between said hub (20) and said sleeve (40); and safety limit stop means (63) to allow a positive driving connection between said hub (20) and sleeve (40) in case of failure of said fastening means (30).

2. Improvement according to claim 1, wherein the given maximum angle ($\theta$) is smaller than about 9°.

3. Improvement according to claim 1, wherein the chamber (42) has approximately cylindrical walls (420) and rim walls (430), and wherein at least one of these rim walls (430) is defined by concentric flanges (431M and 431F) which are on the sleeve (40) and on the hub (20) and which face one another.

4. Improvement according to claim 3, wherein only the rim walls (430) disposed remote from the conical joint are provided with flanges (431).

5. Improvement according to claim 3, wherein the rim walls (430) disposed close to and remote from the conical joint are provided with flanges (431).

6. Improvement to claim 5, wherein the flanges (431) are of different dimensions.

7. Improvement according to claim 3, wherein said approximately cylindrical walls (420) are formed by the bottom of a groove (421).

8. Improvement according to claim 7, wherein said groove (421) is formed partly in the hub (20) and in the sleeve (40).

9. Device according to claim 7, wherein said groove (421) is formed in one of said hub (20) and sleeve (40).

10. Improvement according to claim 1, wherein the friction member (50) is a radially corrugated spring.

11. Improvement according to claim 1, wherein the friction member (50) is an elastic ring.

12. Improvement according to claim 1, wherein the periphery of at least one of opposite ends of the sleeve (40) is provided with a chamfer (44) on the end which is to be directed towards the conical joint.

13. Improvement according to claim 3, wherein the rim wall (430) which is to be disposed close to the conical joint is provided with a bevel 435.

14. Improvement according to claim 3, wherein the amplitude limiter means (62) comprises at least two flats (432) which are formed one on the flange (431) of the sleeve (40) and the other on the flange (431) of the hub (20) and which are placed facing one another and whose respective chords (433) are of different lengths, the chord of the flat on the hub being shorter than that of the flat on the sleeve; and wherein said safety stop means (63) includes axial edges (434) of said flats (432).

15. Improvement to claim 14, each of the flanges (431) has two diametrically opposite flats (432).

16. Improvement according to claim 14 or 15, wherein the control mechanism means (61) comprises at least two notches (610), one disposed in the sleeve (40) and the other in the hub (20), on their respective faces remote from the conical joint.

17. Improvement according to either one of claims 14 or 15, wherein the control mechanism means (61) and amplitude limiter means (62) comprise a cam stud (611) having a rod (612) and a disc (613), and wherein the rod (612) is engaged in a cylindrical hole (206) in the hub sleeve (40).

18. Improvement to claim 17, the hole (206) is radial, and the buttonhole (406) is an open peripheral rectilinear axial groove, an access window (615) is formed in the sleeve (40) and/or the hub (20), in their respective faces which are remote from the conical joint, and wherein the disc (613) has at least one peripheral socket (614) to which access can be gained via said access window (615).

19. Improvement according to claim 17, wherein the sleeve (40) is provided with a shoulder (444) capping the face of the hub (20) remote from the conical joint, the hole (206) is axial, and wherein the buttonhole (406) is radial and formed through said shoulder (44).

20. Improvement according to claim 19, wherein the safety stop means (63) comprises a protuberance (631), associated with the shoulder (444) and turned towards the hub (20), and a recess (632) in the face of the hub (20) remote from the conical joint and of a size enabling said protuberance (631) to be received while limiting its rotation to the value of the maximum angle ($\theta$).

* * * * *